(12) United States Patent  (10) Patent No.: US 8,175,374 B2
Pinault et al.  (45) Date of Patent: May 8, 2012

(54) VOLUME RECOGNITION METHOD AND SYSTEM

(75) Inventors: Gilles Pinault, Brussels (BE); Jeremie Roy, Brussels (BE); Laurent Desmecht, Pont-a-Celles (BE); Xavier Baele, Brussels (BE)

(73) Assignee: Softkinetic Software, Brussels (BE)

( * ) Notice: Subject to any disclaimer, the term of this patent is extended or adjusted under 35 U.S.C. 154(b) by 381 days.

(21) Appl. No.: 12/596,604

(22) PCT Filed: Apr. 20, 2007

(86) PCT No.: PCT/EP2007/053895
§ 371 (c)(1),
(2), (4) Date: Oct. 19, 2009

(87) PCT Pub. No.: WO2008/128568
PCT Pub. Date: Oct. 30, 2008

(65) Prior Publication Data
US 2010/0208035 A1    Aug. 19, 2010

(51) Int. Cl.
*G06K 9/00* (2006.01)
*G06K 9/62* (2006.01)
(52) U.S. Cl. ........................ 382/154; 382/225
(58) Field of Classification Search .......... 382/106–107, 382/154, 203, 224–225, 159, 288; 348/48–50; 345/419–420
See application file for complete search history.

(56) References Cited

U.S. PATENT DOCUMENTS

| | | | |
|---|---|---|---|
| 6,771,818 | B1 | 8/2004 | Krumm et al. |
| 7,646,902 | B2 * | 1/2010 | Chan et al. ............... 382/128 |
| 2002/0050924 | A1 | 5/2002 | Mahbub |
| 2006/0239558 | A1 | 10/2006 | Rafii et al. |
| 2006/0274947 | A1 | 12/2006 | Fujimura et al. |

FOREIGN PATENT DOCUMENTS

| | | |
|---|---|---|
| JP | 5282459 A | 10/1993 |
| JP | 2002056392 A | 2/2002 |
| JP | 2002352200 A | 12/2002 |

OTHER PUBLICATIONS

"Pattern Recognition" by Sergios Theodoridis, Konstantinos Koutroumbas and Ricky Smith, Chapter 12, Clustering Algorithms I: Sequential Algorithms; published by Academic Press in 1998; pp. 383-402.
3-D Layered Representation of Multiview Images Based on 3-D Segmentation Takeshi Naemura, et al., 1997.
Partial English Translations of JP-A-2002-056392; JP-A-5-282459.
Translation of Official Action for JP Appln. No. 2010-503361; Sep. 2, 2011.

* cited by examiner

*Primary Examiner* — Daniel Mariam
(74) *Attorney, Agent, or Firm* — Sughrue Mion, PLLC

(57) ABSTRACT

The present invention relates to a volume recognition method comprising the steps of:
a) capturing three-dimensional image data using a 3D imaging system 3, wherein said image data represent a plurality of points 5, each point 5 having at least a set of coordinates in a three-dimensional space;
b) grouping at least some of the points 5 in a set of clusters 6;
c) selecting, according to a first set of parameters such as position and size, a cluster 6 corresponding to an object of interest 1 located in range of said imaging system 3;
d) grouping at least some of the points 5 of the selected cluster 6 in a set of sub-clusters according to a second set of parameters comprising their positions in the three-dimensional space, wherein each sub-cluster has a centroid 11 in the three-dimensional space; and
e) associating a volume 12 to each of at least some of said sub-clusters, wherein said volume 12 is fixed to the centroid 11 of said sub-cluster. The present invention also relates to a volume recognition system for carrying out this method.

22 Claims, 14 Drawing Sheets

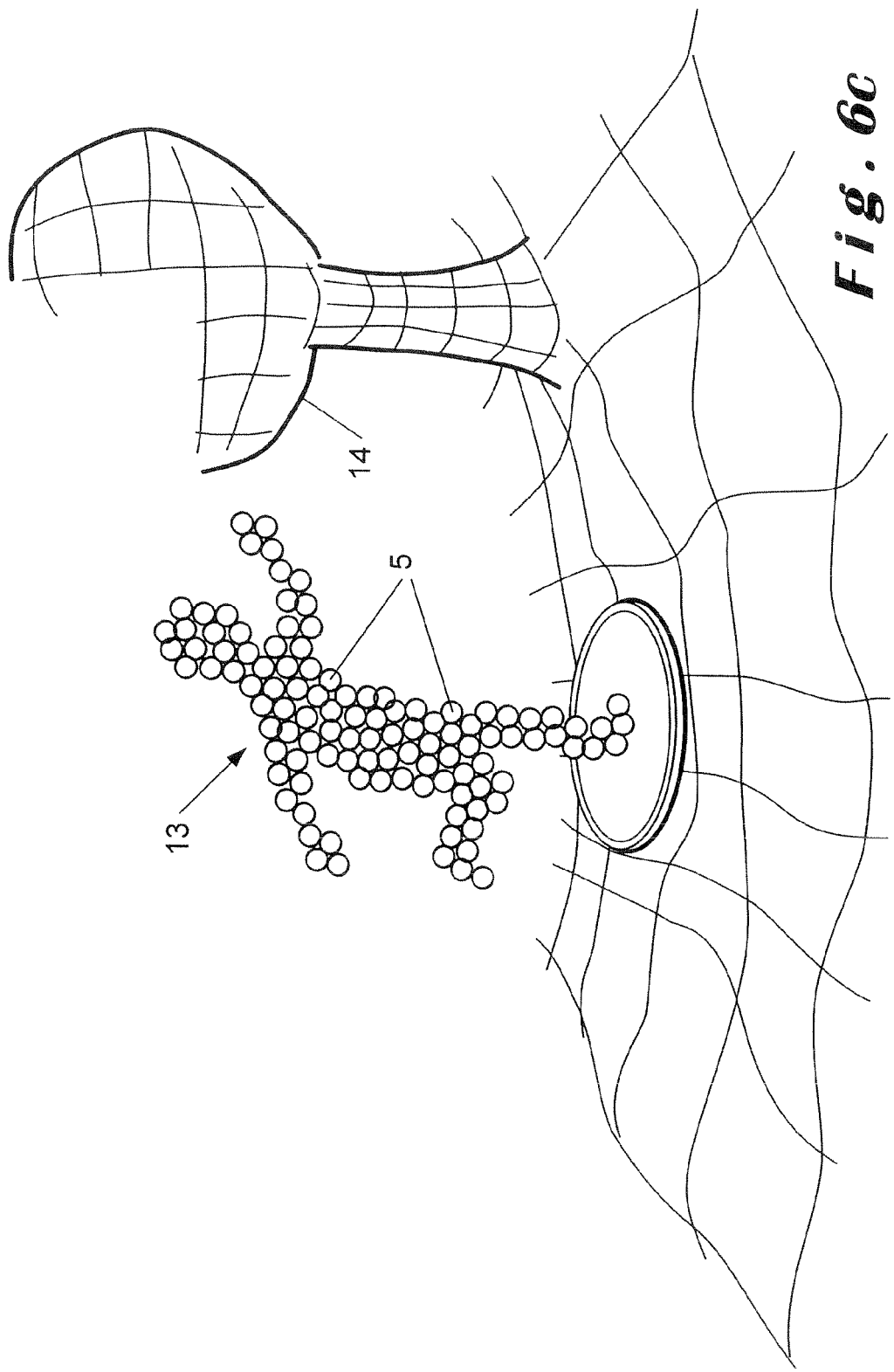

VOLUME RECOGNITION METHOD AND SYSTEM

The present invention relates to a volume recognition method and system, in particular, but not restricted to, a volume recognition method and system for interaction with data processing devices.

Interaction with data processing systems, and in particular the input of data and commands, is a generally known issue. Conventionally, such interaction takes place through physical input devices such as keyboards, mice, scroll wheels, pens, touchscreens, joysticks, gamepads, etc. which produce signals in response to a physical action of the user on them. However, such physical input devices have many drawbacks. For instance, they can only offer a limited amount of different input signals, which in some applications such as three-dimensional "virtual reality" environments will feel awkward and lack realism. Moreover, they are susceptible to wear and their continued use may even have negative consequences for the user's health, such as Repetitive Strain Injury.

Alternative input devices and methods are also known. For instance, practical systems for voice recognition are available. However, voice recognition is not a practical alternative for some applications, such as action games, where rapid, precise and repetitive inputs by the user are required. Moreover, their effectiveness is adversely affected by background noise, and they generally require a learning period to recognise a particular user's voice commands. Another alternative is image recognition. In their simplest form, image recognition systems recognise binary patterns in contrasting colours, such as barcodes, and convert these patterns into binary signals for processing. More advanced image recognition systems can recognise more complex patterns in images and produce a large variety of signals in response. Such image recognition systems have been proposed, for instance, in U.S. Pat. No. 6,256,033, for recognising the gestures of a user in range of an imaging system. However, conventional imaging systems have no perception of depth and can produce merely a 2D projection of said user. As a result, the recognition of the user's gestures is inherently flawed, limited in the range of possible inputs and riddled with possible recognition mistakes. In particular, such systems have problems separating the user from its background.

The development of 3D imaging systems, however, offers the possibility to develop shape recognition methods and devices allowing, for instance, better user gesture recognition. One such 3D imaging system was disclosed in G. Yahav, G. J. Iddam and D. Mandelboum, "3D Imaging Camera for Gaming Application". The 3D imaging system disclosed in this paper is of the so-called "Time-Of-Flight" or TOF type, in which a depth perception is obtained from the shape of a wavefront of light reflected from objects in range of the 3D imaging system. However, other types of imaging systems, such as stereo cameras, LIDAR, radar, sonar, etc. have also been proposed.

A gesture recognition method and system using such a 3D imaging system was disclosed in the International Patent Application WO 00/30023 A1. However, because this method does not recognise volumes as such, but merely responds to the presence of points of a subject in certain regions of interest and their movement therein, it can only recognise the simplest of gestures and remains inappropriate for more complicated applications. An even more basic input method was disclosed in WO 2004/064022 A1.

United States Patent Application Publication US 2006/023558 A1 discloses a shape recognition method using a 3D imaging system. In this method, the points of the 3D image are grouped in clusters or "blobs" according to their perceived depth. Primitives of different shapes of pre-defined objects can then be associated to these "blobs". While this volume recognition method allows more accurate modelling of objects within range of the 3D imaging system, it still has significant drawbacks. As all the objects in the image are allocated a "blob", their number and complexity will be limited by the data processing capabilities available. In practice, this limits this shape recognition method to applications requiring only crude models of objects, such as car collision warning and avoidance systems. It will remain impractical in applications requiring finer volume recognition, such as gesture recognition systems.

US Patent Application Publication US 2003/0113018 A1 and International Patent Application WO 03/071410 A2 both disclose shape recognition methods more suitable for gesture recognition.

In the method disclosed in US 2003/0113018 A1, a user is the closest object to the 3D imaging system and, to disregard the background, the points of the 3D image are selected which are closer than a predetermined depth threshold. The selected points are then grouped in five clusters, representing the torso, head, arms and hands, according to several different criteria and grouping algorithms. The torso and arms are then associated to planar shapes and the head and hands to three-dimensional volumes. While this method allows more advanced gesture recognition, the volume recognition remains relatively crude, especially as the torso and arms are recognised as planar, rather than three-dimensional elements.

In the method disclosed in WO 03/071410 A2 a volume recognition method is disclosed where the points of the 3D image are grouped in clusters according to their perceived depth, as in US 2006/023558 A1, and one of those clusters, representing an object of interest, such as a hand, is selected. A gesture is then recognised by statistical analysis of the characteristics of the points of said selected cluster and comparison with pre-established patterns. Although this method is more powerful than the above-mentioned other prior art methods, it will require a substantial library of patterns for seamless recognition.

The problem addressed by the present invention is therefore that of providing a method and system for quickly recognising a volume of an object of interest within range of a 3D imaging system with comparatively fine detail, so as to allow easier and more accurate interaction with a data processing system, eventually through gesture recognition.

The volume recognition method of the present invention addresses this problem by grouping at least some of the points of a cluster selected according to a first set of parameters such as position and size and corresponding to an object of interest located in range of said imaging system, in a set of sub-clusters according to a second set of parameters comprising their positions in the three-dimensional space, wherein each sub-cluster has a centroid in the three-dimensional space; and associating a volume to each of at least some of said sub-clusters, wherein said volume is fixed to the centroid of said sub-cluster.

By these steps, the volume recognition method of the present invention provides, without having recourse to great processing power, a comparatively accurate three-dimensional model of the object of interest formed by the volumes associated with said sub-clusters. This three-dimensional model, while comparatively accurate, can nevertheless be expressed using just the positions of the centroids of the sub-clusters and the dimensions of the associated volumes, thus facilitating the further processing of the three-dimensional model for interaction with a data processing system, for instance through gesture recognition.

Also advantageously, a K-means algorithm may be used to group said points of the selected cluster in a predetermined number K of sub-clusters. Using a K-means algorithm provides a quick and efficient method of grouping the points in a predetermined number of sub-clusters.

Advantageously, the volume associated to a sub-cluster may be a sphere, preferably centred on the centroid of said sub-cluster. This shape, while allowing good volume recognition, can be characterised using the radius as sole parameter, thus further reducing the size of a dataset expressing the three-dimensional model of the object of interest.

Also advantageously, said grouping of points in clusters may be carried out according to a method comprising the following steps:

a) creating a first cluster comprising a first point; and
b) executing the following operations for each other point:
i) finding the cluster whose centroid is closest to said other point in the three-dimensional space; and
ii) creating an additional cluster comprising said other point if the absolute distance in the three-dimensional space between said other point and said closest cluster centroid is higher than a predetermined threshold $\theta$, and the number of clusters is still under a predetermined maximum q; or
iii) adding said other point to the cluster whose centroid is closest to said other point if said absolute distance is not higher than the predetermined threshold $\theta$, or the number of clusters has already reached said predetermined maximum q.

This method ensures a quick and efficient method of grouping the points of the image data in a set of clusters, each one corresponding to an object distinct in the three-dimensional space, including the object of interest. By grouping the points by this method according to their position in the three-dimensional space, the objects represented in the three-dimensional image can be more reliably differentiated than by a simple selection according to depth, as in the prior art. This eventually will allow the selection of the cluster corresponding to the object of interest even in the presence of several candidates in a tracking area.

Particularly advantageously, said grouping of points in clusters may further comprise the steps of determining whether two of said clusters are connected, and merging connected clusters. This will avoid the potential problem of grouping the points of the object of interest into several clusters, of which only one would then be selected.

Even more advantageously, to determine whether two of said clusters are connected, the following steps can be followed:

a) calculating the standard deviation of the distribution along an axis linking the centroids of the two clusters of the projections of the points of each one of said two clusters; and
b) checking whether the sum of the standard deviations multiplied by a predetermined factor S, for example 2, is higher than the absolute distance between the centroids of the two clusters.

By these steps, an efficient determination of connections between adjacent clusters can be carried out in order to eventually merge connecting clusters.

Advantageously, said imaging system may comprise a time-of-flight 3D camera, a stereo camera, a plurality of cameras located in different positions in the three-dimensional space, or a LIDAR, sonar or radar system. Any one of these imaging systems may provide three-dimensional image data suitable for volume recognition.

Advantageously, said imaging system may comprise said at least depth and zenith and azimuth angles of each point, and further comprising a step of transforming depth and zenith and azimuth angles of at least some of these points into three-dimensional Cartesian coordinates. This allows easier handling of depth images provided by a 3D imaging system in this volume recognition method.

Advantageously, said object of interest can be at least part of a human body, preferably standing. This will enable a human user to interact with a data processing device using at least part of his body.

Particularly advantageously, said method may further comprise the step of calculating approximated centre of mass and main axis of the torso of said body. Since the position, orientation and movement of a torso of a user can be particularly useful for interacting with a data processing system, for instance for "virtual reality" applications, calculating its approximated centre of mass and main axis, independently of the position and motion of any spread extremities, can be particularly advantageous.

Even more advantageously, said approximated centre of mass and main axis of the torso may be calculated by executing the following steps:

a) calculating the centroid and main axis of said selected cluster;
b) calculating the distribution curve of the distances of the points of the selected cluster with respect to said main axis of the selected cluster;
c) calculating an inflection point in said distribution curve;
d) selecting the points with distances with respect to said main axis of the selected cluster inferior to D·s, wherein s is the distance of said inflection point to said main axis of the selected cluster and D is a factor of at most 1.25, preferably at most 1; and
e) calculating said centre of mass and main axis of the torso as the centroid and main axis of the selected points.

As in a cluster corresponding to a human body the points corresponding to any spread extremity will usually be clearly detached from the area of biggest density of points, which will correspond to the torso, this steps will allow to discount them in the calculation of the approximated centre of mass and main axis of the torso.

Particularly advantageously, signals may be transmitted to a data processing system according to the position of the centre of mass of said torso and/or its main axis and/or the orientation of said main axis of said torso. As stated above, this will allow a particularly natural interaction of the user with, for instance, a "virtual reality" application.

Particularly advantageously, said method may further comprise the step of measuring the height of the body.

Even more advantageously, a particularly accurate measure of the height of the body may be obtained by calculating the heights of the points among those of said selected cluster that are closer than a predetermined distance to the main axis of the torso, filtering said heights, preferably by median filtering, and selecting the maximum value of said heights after filtering. A height measurement obtained by these steps will usually not be influenced by the position of any stretched arm, so that it can reliably be used for purposes such as that of determining the position of the head of the user.

Even more advantageously, said measure of the height of the body may be only considered as valid if a set of conditions is met, such as said main axis of the torso being substantially vertical.

Advantageously, the volumes associated with said set of sub-clusters may be represented in a virtual environment generated by a data processing system. This would allow a comparatively realistic representation of the object of interest in a chosen virtual environment with a relatively small processing effort. The volumes could, for example, serve as an avatar of a user, if said user's body is the object of interest.

Even more advantageously, there may be a collision check between the representation of the volumes of said set of sub-clusters and a set of elements of said virtual environment, so as to interact with said set of elements of the virtual environment. Thus, a user could for instance push, grip, activate or pull an element of the virtual environment by moving so that said representation touches said element.

Advantageously, a set of links between sub-clusters may be established using criteria such as absolute distance between the centroids of the sub-clusters, the presence of points between sub-clusters, etc. In this way, the underlying structure of the object of interest may be recognised, thus facilitating eventual interactions and possibly allowing the creation of an accurate three-dimensional model of the object of interest with a further reduced dataset.

Even more advantageously, a set of extremities of said object of interest may be identified according to said links. Different signals could thus be assigned to movements or positions of extremities, or even to the relative movements or positions between extremities, thus increasing the versatility of an input interface using this volume recognition method.

Even more advantageously, at least one of said extremities is labelled according to a predetermined pattern, for example that of a human body. Different signals could thus be assigned to the movements or positions of different extremities, thus further increasing the versatility of an input interface using this volume recognition method.

Even more advantageously, signals can be transmitted to a data processing system according to an absolute and/or relative position and/or movement of at least one of said extremities. This would provide a particularly versatile interaction method.

The present invention also relates to a volume recognition system comprising an imaging system for capturing three-dimensional image data representing a plurality of points, each point having at least a set of coordinates in a three-dimensional space, and at least some of said points corresponding to an object of interest located in range of said imaging system, and a data processing system connected to said imaging system and programmed for carrying out, in cooperation with said imaging system, the volume recognition method of the invention.

Several preferred embodiments of the invention will be described illustratively, but not restrictively with reference to the accompanying figures, in which:

FIG. 6b shows 150 spheres, each centred in one of the centroids of FIG. 6a;

FIG. 6c shows the 150 spheres of FIG. 6b representing the user in a virtual environment;

FIG. 7b shows a network linking the centroids of FIG. 7a;

FIG. 8b shows a distribution curve of the points in FIG. 8a;

Figure 1:
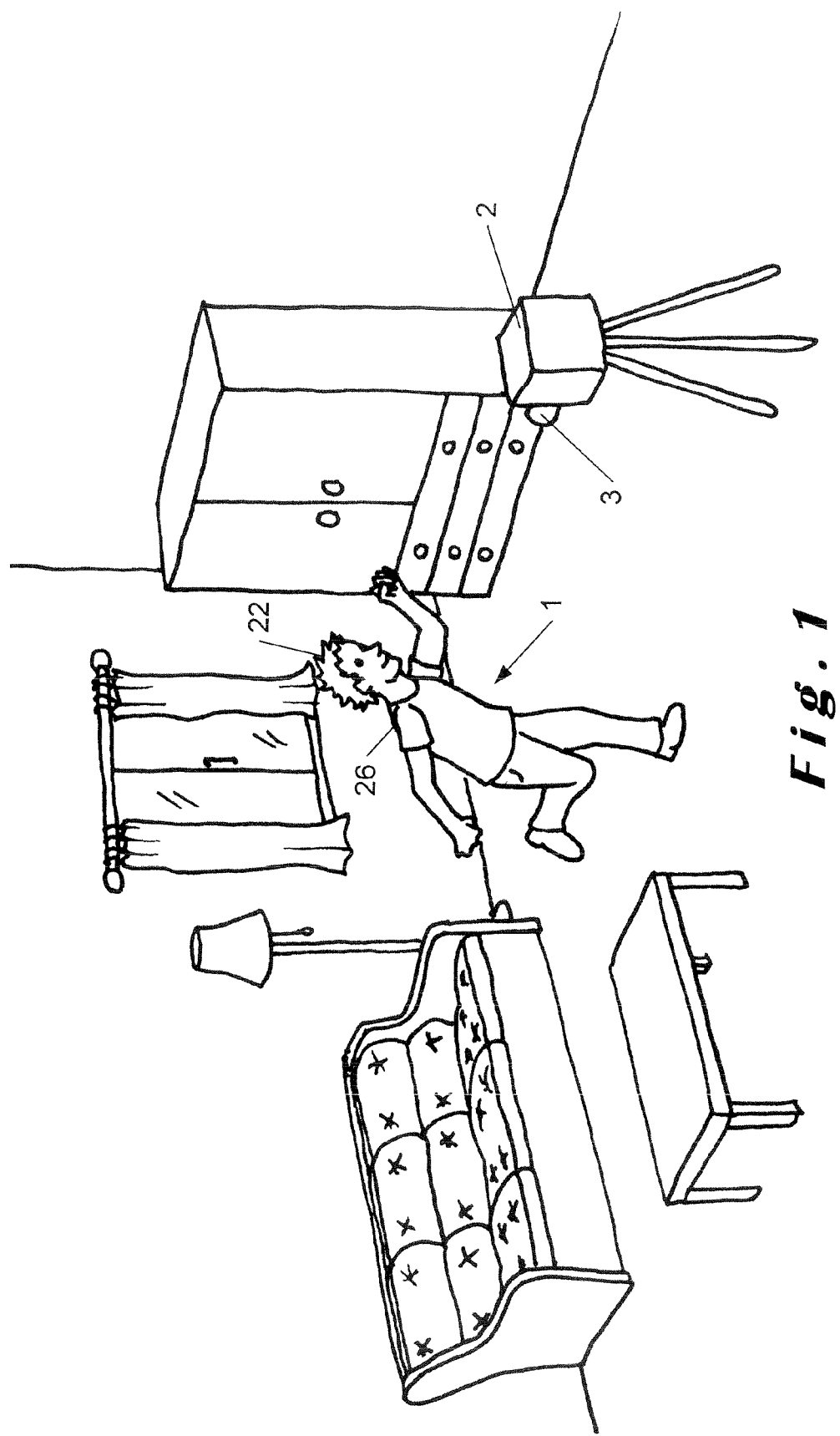
FIG. 1 shows a room with a user standing in front of a 3D imaging system for interaction with a data processing system using a volume recognition system and method according to an embodiment of the present invention.

One of the possible uses of an embodiment of the volume recognition method and system is illustrated in FIG. 1. In this application, this system and method are used for the recognition of the gestures of an object of interest, in this case a human user 1, in order to interact with a data processing device 2 generating a virtual environment displayed to the human user 1.

The volume recognition system comprises a 3D imaging system, in this particular embodiment a time-of-flight (TOF) 3D camera 3. This TOF 3D camera 3 is connected to the data processing device 2 with which the human user 1 is to interact. In this embodiment, this data processing device 2 is itself programmed to carry out, in cooperation with the TOF 3D camera 3, the volume recognition method of the invention. Alternatively, a separate data processing device programmed to carry out said method could be connected between the TOF 3D camera and the data processing device 2 so as to enable the human user to interact with said data processing device 2.

Figure 2:
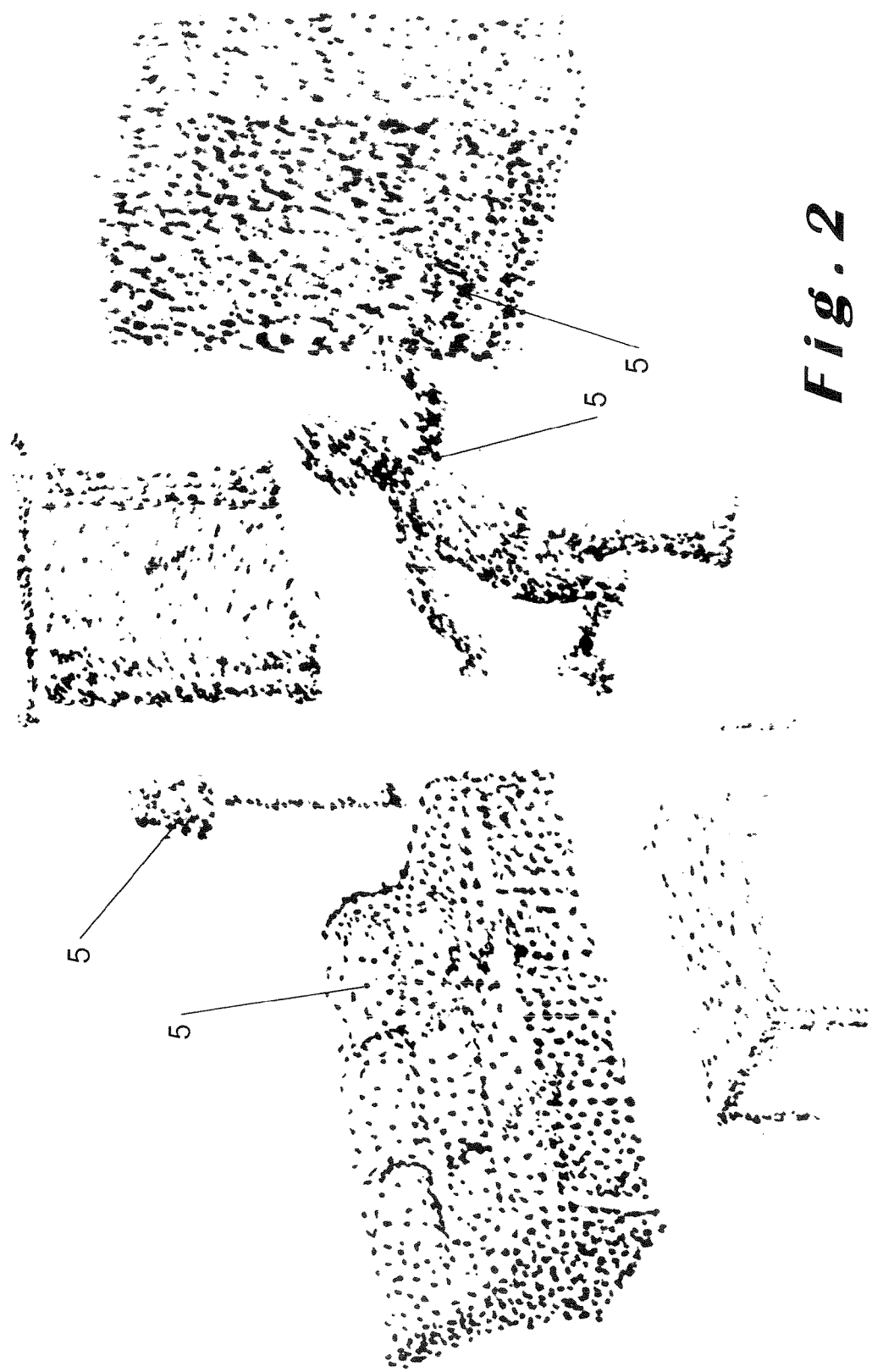
FIG. 2 shows three-dimensional image data of the same room, in the form of points distributed in the three-dimensional space, as captured by the 3D imaging system.

The TOF 3D camera 3 captures 3D image data of the room 4 in which the human user 1 stands, comprising a 2D image of the room with a plurality of pixels and a depth value for each pixel corresponding the distance to the TOF 3D camera 3 of the point imaged by that pixel. Since the X and Y positions of the pixels in the 2D image themselves correspond to zenith and azimuth angles of the points they represent with respect to the TOF 3D camera 3, these 3D image data can be illustrated as in FIG. 2 by a three-dimensional cloud of points 5 corresponding to visible points of the objects in range of the TOF 3D camera 3. For ease of processing, the depth and the zenith and azimuth angles of each point 5 with respect to the TOF 3D camera 3 can be converted into Cartesian coordinates.

Figure 3:
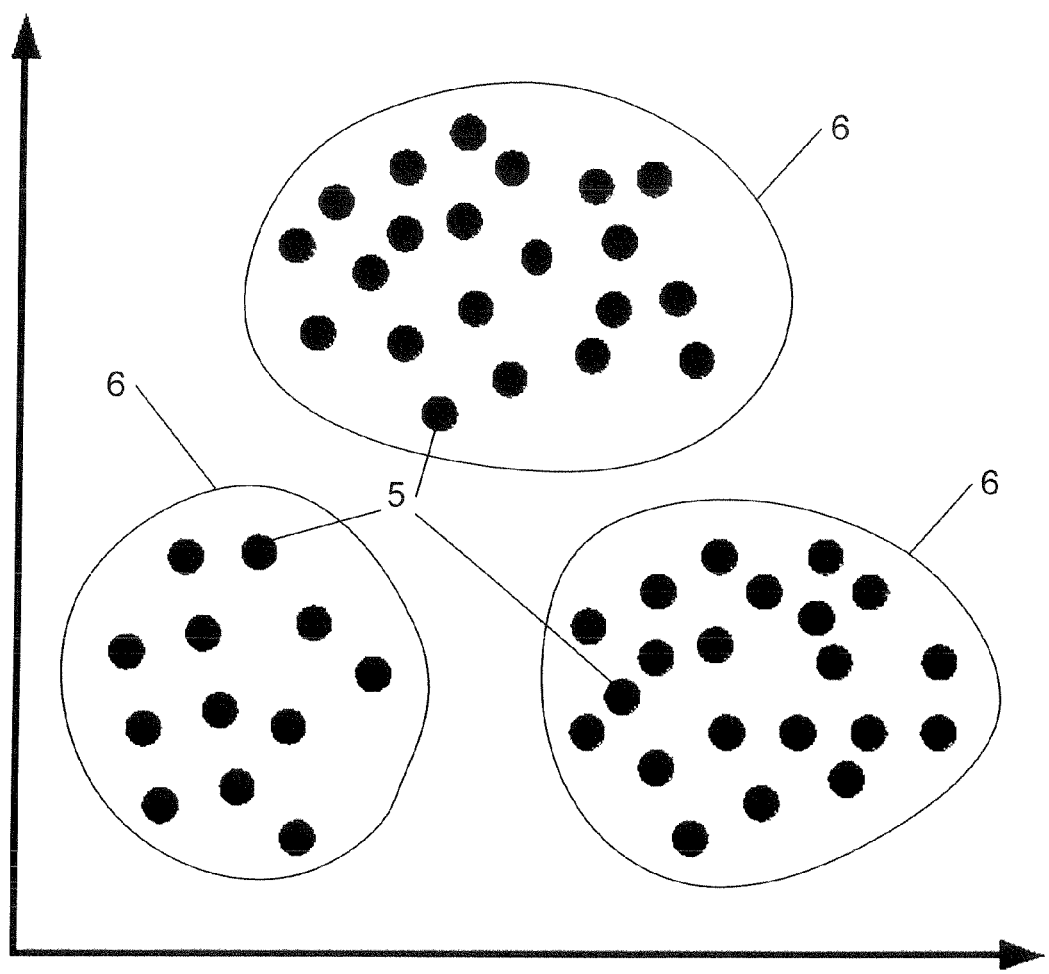
FIG. 3 shows how points are grouped into clusters according to their respective positions.

In the next step of the volume recognition method of the invention, these points 5 are grouped into clusters 6. A cluster 6 will contain neighbouring points 5, as illustrated in FIG. 3. This clustering is carried out using a BSAS algorithm, such as was described in Chapter 12 of "Pattern Recognition" by Sergios Theodoridis, Konstantinos Koutroumbas and Ricky Smith, published by Academic Press in 1998, which has the advantage of speed, as it will perform this clustering in a single pass, not needing a plurality of iterations to provide adequate results.

To carry out this clustering, a first cluster 6 comprising a first point 5 is created, and then the following operations are carried out for each other point 5:

i) finding the cluster 6 whose centroid 7 is closest to said other point 5 in the three-dimensional space; and ii) creating an additional cluster 6 comprising said other point 5 if the absolute distance in the three-dimensional space between said other point 5 and said closest cluster centroid 7 is higher than a predetermined threshold $\theta$, and the number of clusters 6 is still under a predetermined maximum q; or iii) adding said other point 5 to the cluster 6 whose centroid 7 is closest to said other point 5 if said absolute distance is not higher than the predetermined threshold θ, or the number of clusters has already reached said predetermined maximum q.

Figure 4:
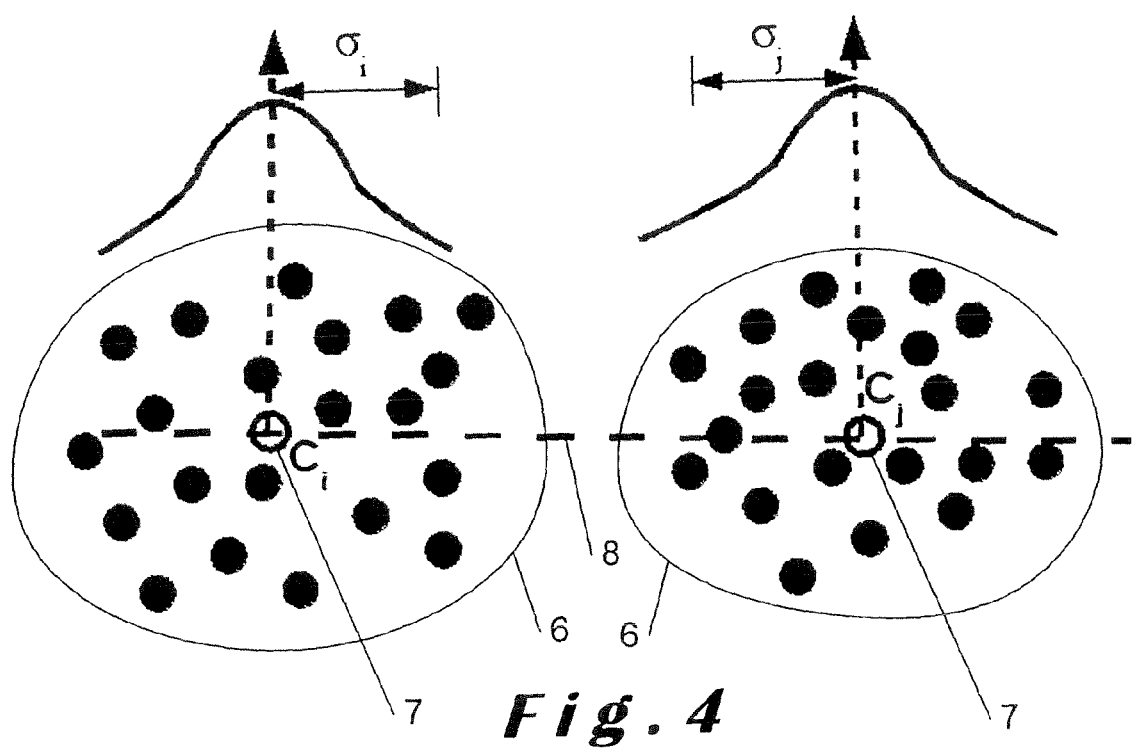
FIG. 4 shows how neighbouring clusters are checked for connections.

This clustering step will result in a plurality of clusters 6 comprising the points 5. However, the use of this algorithm may result in several of the clusters 6 actually being connected. To properly group the points 5, such connected clusters 6 will be detected and merged as depicted in FIG. 4.

To determine whether two clusters 6 are connected, the points 5 of these two clusters 6 are first projected onto an axis 8 linking the centroids 7 of the two clusters 6. Then the standard deviation of the distribution of the resulting projections along the axis 8 is calculated for each of the clusters 6. The two clusters 6 will be determined to be connected if the sum of these standard deviations, multiplied by a predetermined factor S, which in this particular embodiment is 2, is found to be higher than the absolute distance between the centroids 7 of the two clusters 6. In this case the two clusters 6 will be merged to form a single one.

Figure 5:
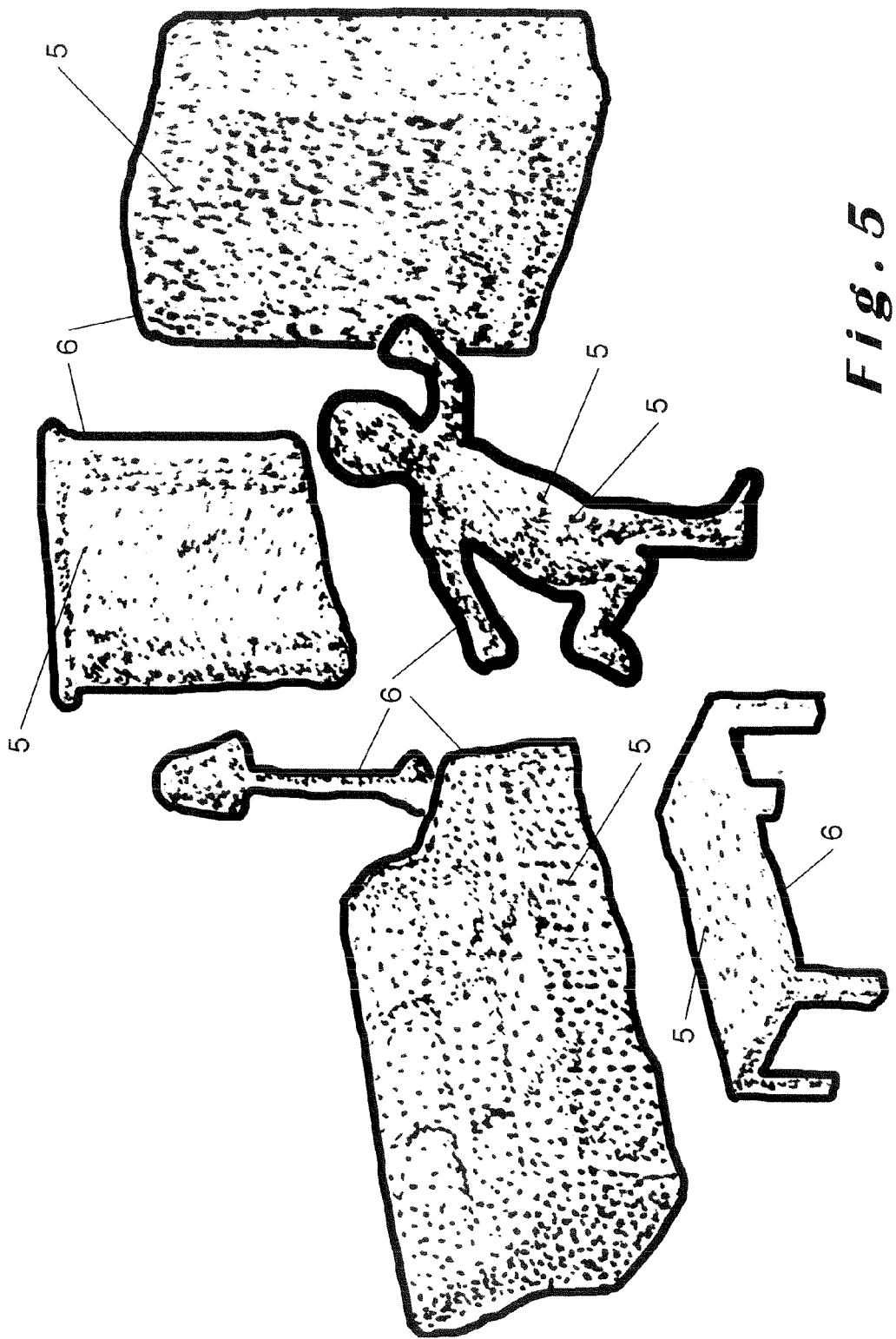
FIG. 5 shows the same three-dimensional image data of FIG. 2, wherein the points have been grouped in clusters, one of said clusters corresponding to the user.
Figure 9:
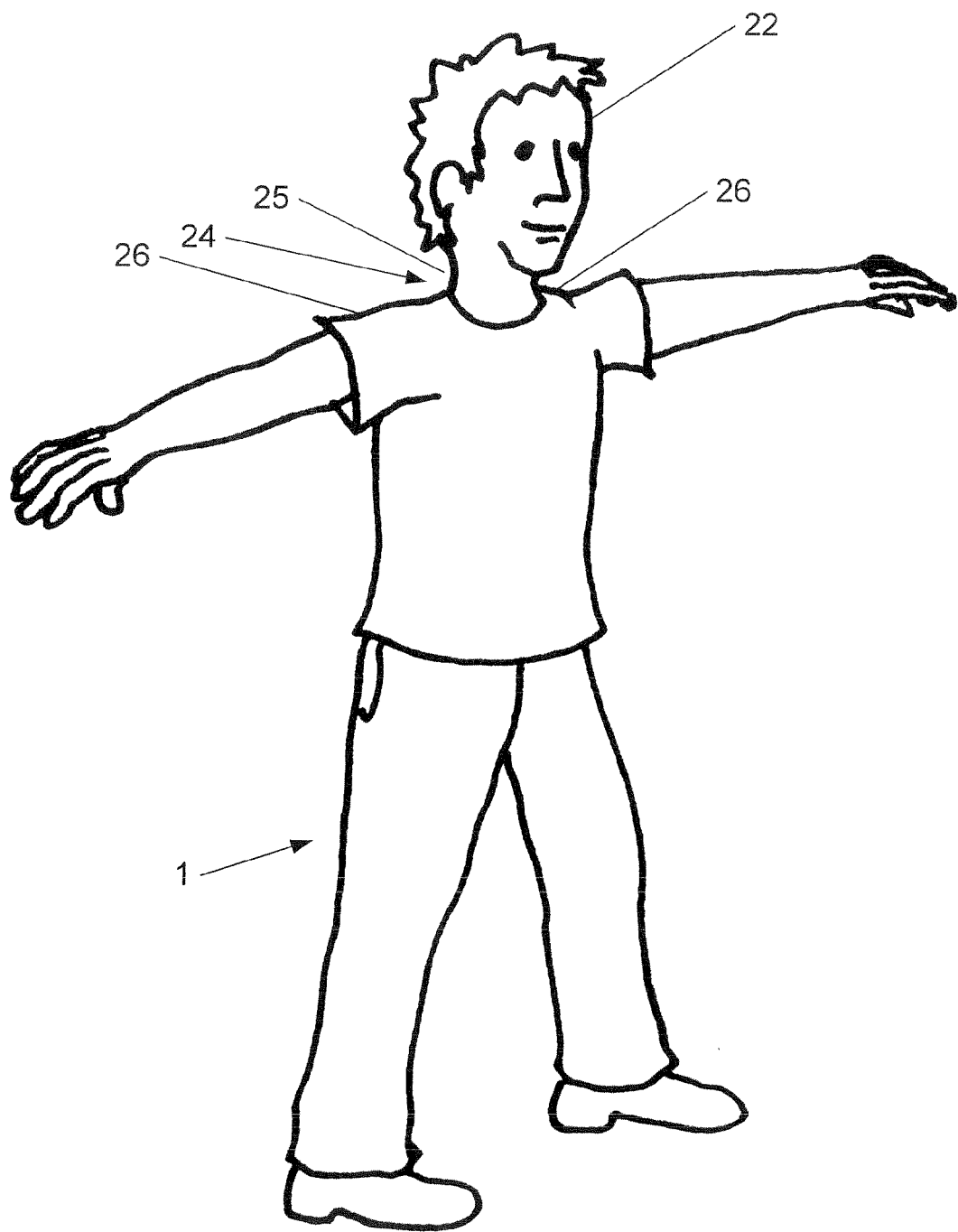
FIG. 9 shows the user in an initialisation position, facing a screen of a data processing device with extended arms.

The result of this clustering and merging will be a set of clusters 6 roughly representing the various objects in range of the TOF 3D camera 3, as illustrated in FIG. 5. Of these clusters 6, one will represent the human user 1. This cluster 6 representing the human user 1 can be identified by a variety of means. For instance, a cluster 6 will be recognised as representing the human user 1 if it is in a determined tracking area where the human user 1 should stand to interact with the data processing device 2 and if it comprises a minimum number of points 5. If several clusters 6 fulfil these criteria, the cluster 6 closest to the TOF 3D camera 3 can be chosen as representing the human user 1. Another criterion for identifying the cluster 6 representing the human user 1 can be conformity of the distribution of the points 5 of that cluster to a predetermined pattern consistent with a human body. For instance, if in an initialisation sequence the human user 1 stands with extended arms as illustrated in FIG. 9, the points 5 of the cluster 6 representing the human user 1 will be distributed according to a characteristic and easily recognised pattern. When the TOF 3D camera 3 is a moving picture camera capturing a series of 3D image data frames at successive moments, another possible criterion for identifying the cluster 6 corresponding to the human user 1 can be proximity with the cluster 6 which was identified as representing the human user 1 in previous frames. In this way, for instance, the volume recognition system could continue to track the human user 1 first recognised during the initialisation sequence as described above even after he takes a posture less easily recognised as human or even after other people enter the tracking area.

Hence, it would be possible to interact with the data processing device 2 through, for example:
   the presence or absence of a human user 1 within range of the TOF 3D camera 3;
   the number of clusters 6 recognisable as corresponding to human users 1; and/or
   the general disposition of the room 4.

The human user 1 would also be able to interact with the data processing device 2 through characteristics of the cluster 6 representing the human user 1, such as:
   the symmetry of at least part of the cluster 6;
   the distribution of at least part of the cluster 6 in space;
   the dispersion of the points 5 in at least part of the cluster 6;
   the centroid 7 of at least part of the cluster 6; and/or
   the main axes of at least part of the cluster 6.

Once the cluster 6 representing the human user 1 is identified, it is subdivided into a set of K sub-clusters. The points 5 of the cluster 6 are grouped into these K sub-clusters using a K-means algorithm.

The K-means algorithm starts by partitioning the points 5 into K initial sub-clusters. It then calculates the centroid 11 of each initial sub-cluster. It constructs a new partition in K sub-clusters by associating each point 5 with centroid 11 which is closest in the three-dimensional space, although additional parameters, such as colour, may be used. Then the centroids 11 are recalculated for the new sub-clusters. This process can be iterated until the points 5 no longer switch sub-clusters, or until the positions of the centroids 11 stabilise. In practice, good results can be attained with a single iteration.

Figure 6A:
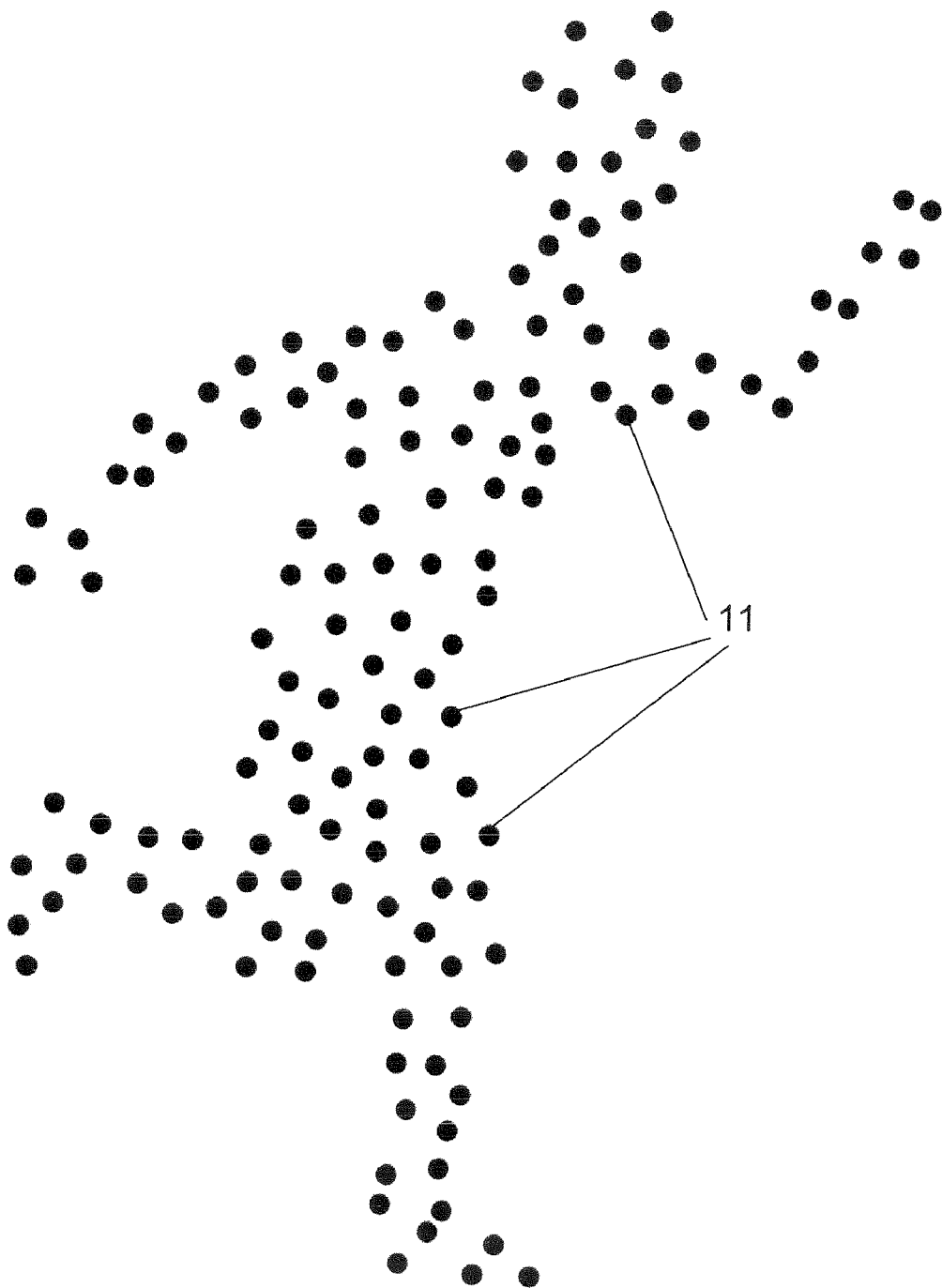
FIG. 6a shows the centroids of 150 sub-clusters of the cluster corresponding to the user.
Figure 6B:
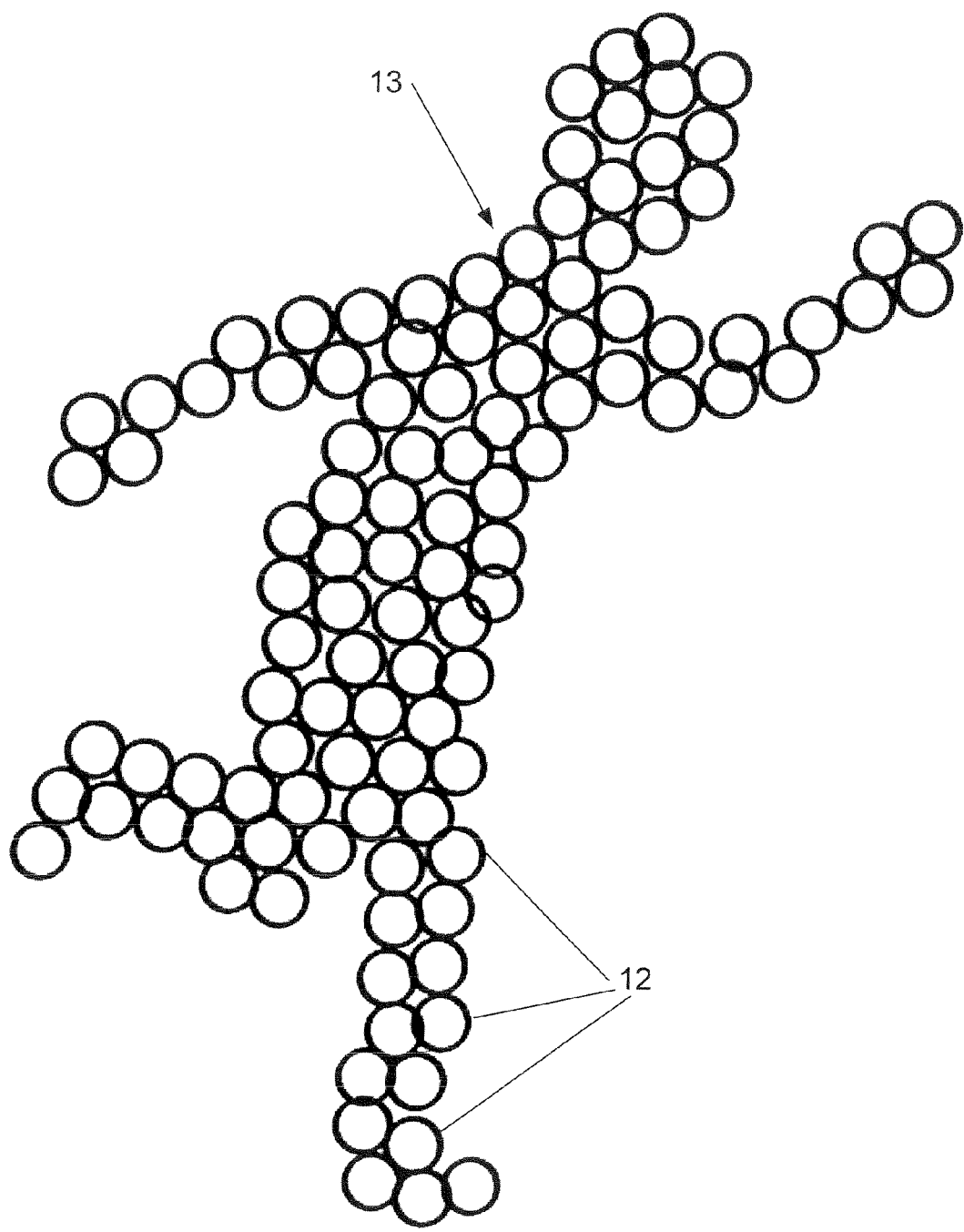

In a first embodiment, the K initial sub-clusters are determined randomly or according to certain parameters of the cluster 6, such as height of the cluster 6 or distribution of the points 5 in the cluster 6, and K is a comparatively high number, such as 150. Using this K-means algorithm then results in a set of 150 sub-clusters, each with a centroid 11, as represented in FIG. 6a. Associating a sphere 12 of a predetermined radius to each one of the 150 sub-clusters then results in a model 13 of the human user 1, as represented in FIG. 6b. This model 13 represents the volume occupied by the human user 1 with good accuracy.

FIG. 6c illustrates the model 13 represented in a virtual environment generated by the data processing device 2. The human user 1 can then interact with elements 14 of this virtual environment through simple collision and/or proximity checks between the representation of the spheres 12 in the virtual environment and the elements 14 of the virtual environment. Hence, the human user 1 would also be able to interact with the data processing device 2 through, for example:
   the collision or proximity in one or several dimensions of the representation of at least one sphere 12 with at least one element 14 of a virtual environment generated by the data processing device 2, wherein said element 14 can be punctual, mono-, bi- or three-dimensional;
   the collision or proximity in one or several dimensions of the representation of at least one sphere 12 with a representation of at least one real object of the real environment of the human user 1 in the virtual environment generated by the data processing device 2;
   the position and/or movement of one or several of the centroids 11 of the sub-clusters; and/or
   the position, movement and/or shape of the volume formed by the spheres 12 associated with at least one of the sub-clusters, for example those sub-clusters whose centroids 11 show substantial movement.

Figure 8A:
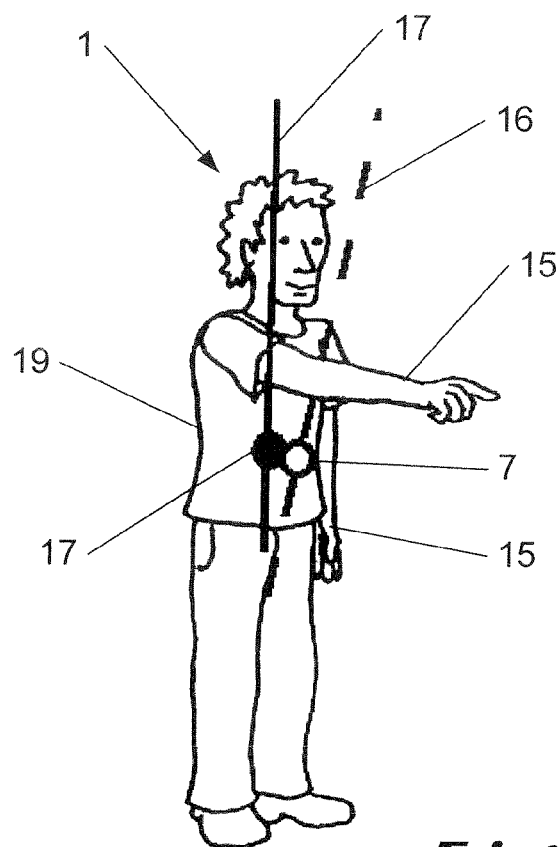
FIG. 8a shows a view of the user with the right arm extended, and the centroid and main axis of the cluster representing the user, as well as the centre of mass and main axis of the torso of the user.
Figure 8B:
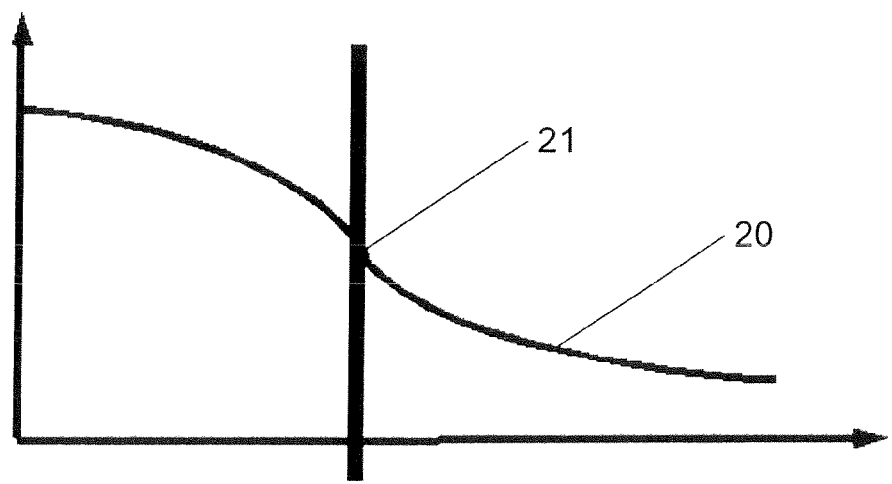

In a second embodiment, the shape of the cluster 6 corresponding to the human user 1 is analysed so as to extract characteristics of the body of the human user 1, such as the centre of mass, the general orientation, the position of the head, the position and orientation of the shoulders and the height. While several of these characteristics, such as centre of mass or general orientation, could be calculated from the points 5 of the whole cluster 6, the results would be exaggeratedly influenced by the position of the arms 15 of the human user 1, as illustrated in FIG. 8a, wherein the centroid 7 and the main axis 16 of the cluster 6 representing the human user 1 with the right arm 15 extended is represented superposed with the body of the human user 1. For this reason, in this particular embodiment, the points 5 corresponding to the arms 15 are identified and discounted first, so as to be enable the calculation of the centre of mass 17 and main axis 18 of the torso 19 of the human user 1, wherein as torso 19 we understand the whole body of the user 1 with exception of the arms 15. For this purpose, the following steps are executed:
   a) calculating the centroid 7 and main axis 16 of said selected cluster 6;
   b) calculating the distribution curve 20, as represented in FIG. 8b of the distances of the points 5 of the selected cluster 6 with respect to said main axis 16;
   c) calculating an inflection point 21 in said distribution curve 20;

d) selecting the points 5' with distances with respect to said main axis 16 of the selected cluster 6 inferior to D·s, wherein s is the distance of said inflection point 21 to said main axis 16 of the selected cluster 6 and D is a factor of at most 1.5, preferably at most 1.25; and e) calculating said centre of mass 17 and main axis 18 of the torso 1 as the centroid and main axis of the set of selected points 5.

This process can be carried out iteratively, but usually a single pass can achieve already good results.

The position of the head 22 and the shoulders 23 in the cluster 6 can be identified by the characteristic angles 24 formed by the neck 25 and the shoulders 26. From the positions of the two shoulders 26, their orientation can also be inferred. In the initialisation sequence illustrated in FIG. 9, the human user 1 may be asked to face an output display screen, so that the orientation of the shoulders 26 can be considered to be parallel to that of the output display screen, which will provide a reference value for later use. This initialisation sequence thus can provide at least a reference for the orientation of the output display screen, as well as a reference for the initial position of the human user 1 with respect to the TOF 3D camera 3. Some later interactions of the human user 1 with the data processing device 2 may relate to the relative position of at least part of the human user 1 with respect to said initial position.

The height of the human user 1 is also calculated using only the selected points 5. For better accuracy, a mean filtering of the selected points 5 is carried out, and the height of the highest remaining selected point 5 is identified as the height of the human user 1. This height measurement will only be considered valid if a set of conditions is met, such as said main axis 18 of the torso 19 being substantially vertical or said highest remaining selected point 5 being in or near the region of the cluster 26 identified as representing the head 22.

If the TOF 3D camera 3 is a moving picture camera, the height measurements for several frames are sent to a Gaussian mixture model, so as to take into account possible noise and temporary low positions of the human user 1. The Gaussian with the maximum average having a sufficient weight will provide a robust value of the height of the human user 1.

Figure 7A:
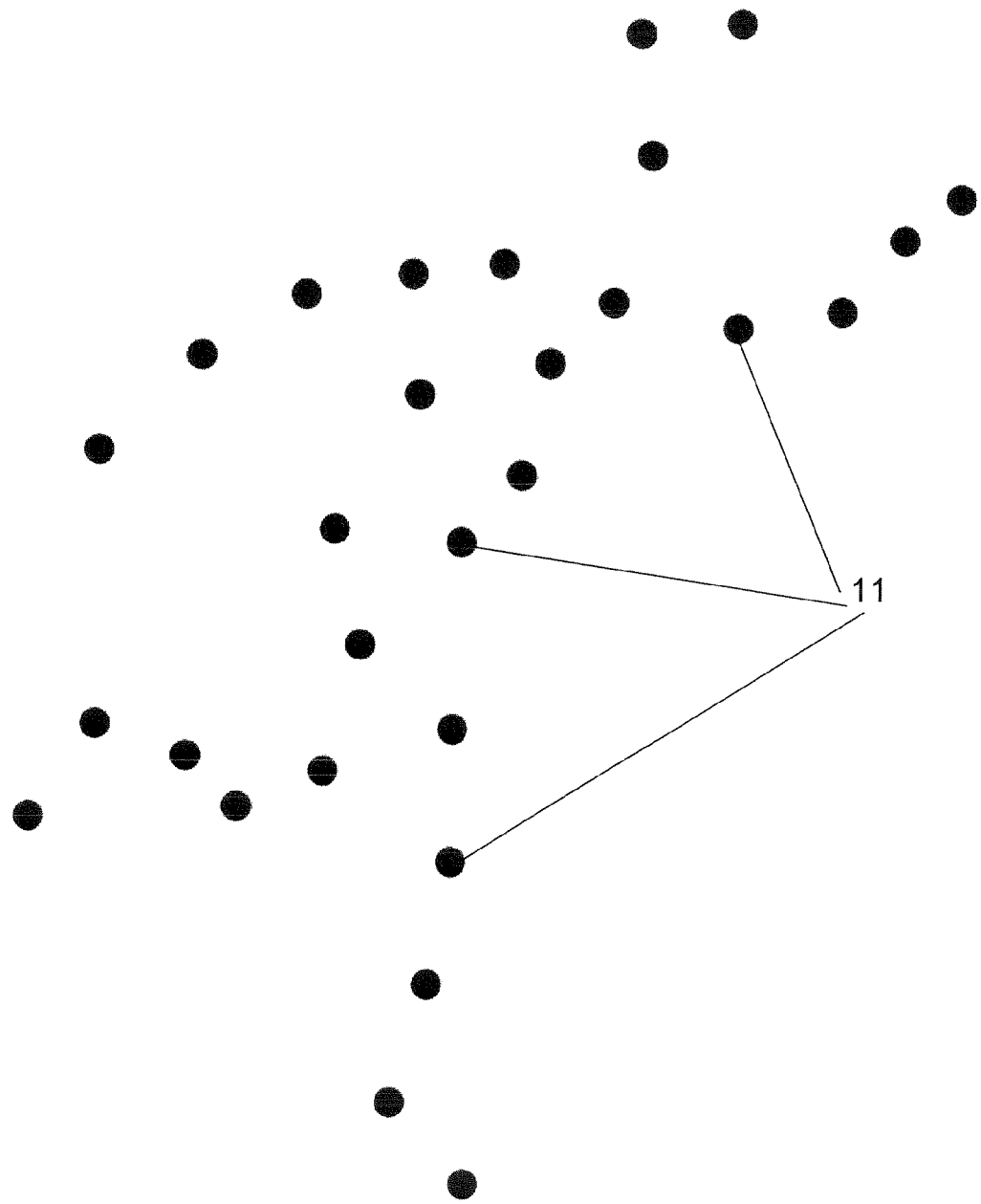
FIG. 7a shows the centroids of 25 sub-clusters of the cluster corresponding to the user.

In this second embodiment, the parameters obtained from this analysis of the shape of the cluster 6, such as height, centre of mass 17 and main axis 18 of the torso 19, position of the head 22 and position and orientation of the shoulders 26 can be used in the partition of the cluster 6 into K sub-clusters using the K-means algorithm. For instance, one of the K initial sub-clusters may comprise at least some of the points 5 identified as corresponding to the head 22. The cluster 6 can thus be partitioned into a lower K number of sub-clusters, such as 25, that however follow a pattern corresponding to the structure of a human body. The centroids 11 of 25 such sub-clusters are represented in FIG. 7a.

Figure 7B:
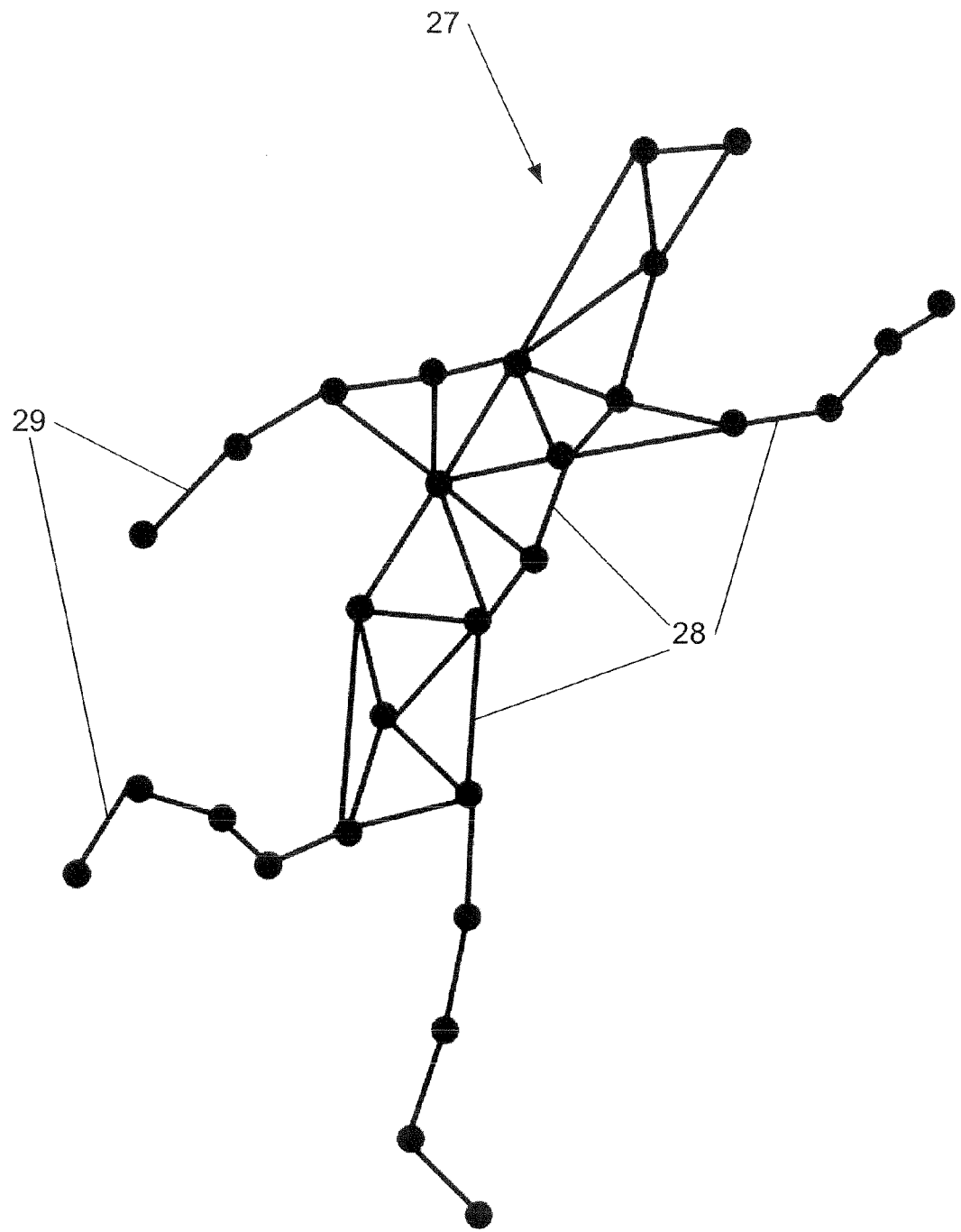

It is then possible to determine which sub-clusters are connected, using criteria such as absolute distance between the centroids 11 of the sub-clusters, the presence of points 5 between sub-clusters, etc. The purpose of determining these connections between sub-clusters is that of generating a network 27 of links 28 between the centroids 11 of sub-clusters, as represented in FIG. 7b. From such a network 27 it can then be inferred which sub-clusters form extremities 29, as they should have fewer links 28 to other sub-clusters.

Hence, the human user 1 will be able to interact with the data processing device 2 through, for example:

the position and/or movement of the centre of mass 17;
the position, orientation and/or movement of the main axis 18;
the position, orientation and/or movement of the shoulders 26;
the position and/or movement of the head 22;
the position, orientation, movement and/or shape of one or several extremities 29.

Absolute as well as relative positions and movements can be used for these interactions. For example, the human user 1 may interact with the data processing device 2 through the relative positions and movements of extremities 29 with respect to each other, to the main axis 18, shoulders 26, head 22 and/or at least one element 14 of a virtual environment generated by the data processing device 2 can be the source of interactions.

Figure 7C:
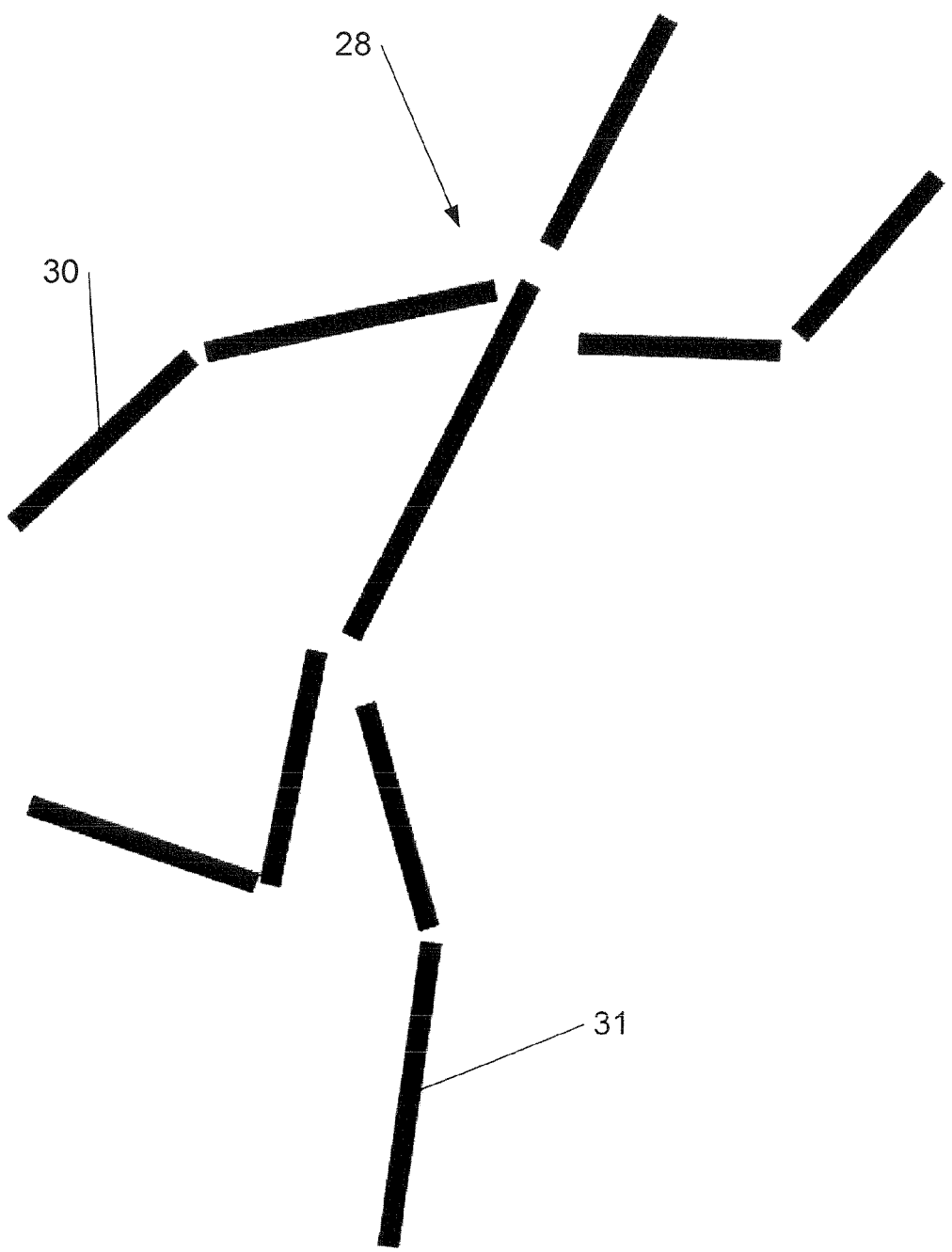
FIG. 7c shows a virtual body structure based on the network of FIG. 7b.
Figure 7D:
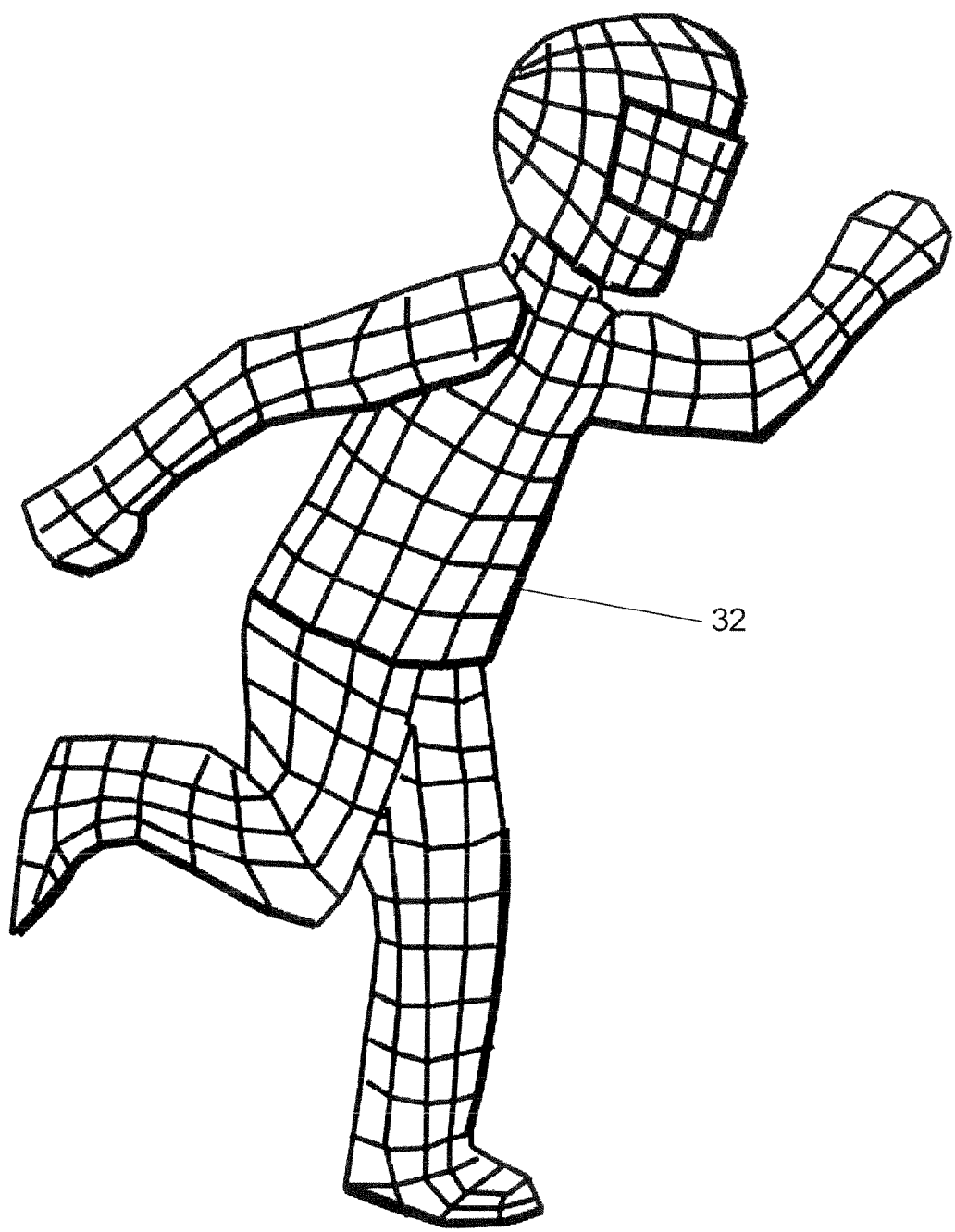
FIG. 7d shows a user avatar based on the virtual body structure of FIG. 7c.

As illustrated in FIG. 7c, the network 27 can be used to generate a structure 28 following a predetermined pattern, such as that of a human body. Thus, extremities 2 are not just identified as extremities in general, but also labelled as being, for example, the right arm 30 or the left leg 31 in particular. This further increases the possibilities of interaction. It also allows the generation of a voluminous avatar 32, as shown in FIG. 7d, to represent the human user 1 in a virtual environment.

All the above-mentioned interactions can take place separately or in a combined manner. It is, for example, also possible to carry out the processes of both the described embodiments to allow a human user 1 to interact with the data processing device 2 both through the volume occupied by 150 spheres 12 and by the relative movement of his extremities 2.

Likewise, the volume recognition system and method of the present invention can be used alone or in combination with other user interfaces suitable for communication with a data processing device 2, such as: switch, keyboard, mouse, trackball, tablet, touchpad, touchscreen, 6-DOF peripheral, joystick, gamepad, motion tracking system, eye tracking device, dataglove, 3D mouse, voice recognition, bioelectric sensor, neuronal interface, treadmill, static bicycle, rowing machine, or any other sensor or interface suitable for providing input to a data processing device 2.

Among the commands and inputs that may be provided to a data processing device 2 through the volume recognition system and method of the present invention, there are:

2D and/or 3D navigation, such as point of view rotation, translation, positioning and/or orientation, as well as other vision parameters, such as perspective, range, colour, exposition, etc.

Interface element navigation, comprising i.a. navigations within menus, lists, parameter choices, and/or input fields.

Manipulation, comprising i.a. avatar control, control of application object parameters, such as position, orientation, translation; rotation, appearance, shape and/or function and/or control of system parameters.

Triggering, such as validation of i.a. action commands, parameter change commands and/or change of state commands, action commands and/or commands to change the state of an application object, a control parameter and/or other.

Selection of i.a. interface elements, application objects, real environment objects, etc.

Force input, for instance in physical simulations.

Output parameter adjustment, for instance for sound volume, appearance of application objects, presentation of application objects.

The data processing device 2 can in turn be connected to any of a variety of output devices, such as, for example:

Computer output devices, such as a 2D or 3D display devices, loudspeakers, headphones, printers, haptic output devices, ventilators and/or background lighting.

Virtual reality output devices, such as virtual reality goggles, portable display devices, multiple display devices such as Cave®, large display devices such as Reality Center®, stereoscopic screens, force return devices, 3D display devices, smoke machines, and/or sprinklers.

Home automation devices, such as window shutter control devices, heating control devices and/or lighting control devices.

Home entertainment devices, such as TVs and/or music systems.

Portable devices, such as portable music and/or video players, positioning systems, personal digital assistants, portable computers and/or mobile telephones.

Other devices connectable to a data processing device 2, such as valves, treadmills, etc.

Although the present invention has been described with reference to specific exemplary embodiments, it will be evident that various modifications and changes may be made to these embodiments without departing from the broader scope of the invention as set forth in the claims. Accordingly, the description and drawings are to be regarded in an illustrative sense rather than a restrictive sense.

The invention claimed is:

1. Volume recognition method comprising the steps of:
   a) capturing three-dimensional image data using a 3D imaging system (3), wherein said image data represent a plurality of points (5), each point (5) having at least a set of coordinates in a three-dimensional space;
   b) grouping at least some of the points (5) in a set of clusters (6); and
   c) selecting, according to a first set of parameters, a cluster (6) corresponding to an object of interest (1) located in range of said imaging system (3);
   and characterised in that it further comprises the steps of:
   d) grouping at least some of the points (5) of the selected cluster (6) in a set of sub-clusters according to a second set of parameters comprising their positions in the three-dimensional space, wherein each sub-cluster has a centroid (11) in the three-dimensional space; and
   e) associating a volume (12) to each of at least some of said sub-clusters, wherein said volume (12) is fixed to the centroid (11) of said sub-cluster.

2. Volume recognition method according to claim 1, wherein a K-means algorithm is used to group said points of the selected cluster (6) in a predetermined number K of sub-clusters.

3. Volume recognition method according to claim 1, wherein the volume (12) associated to a sub-cluster is a sphere, preferably centred on the centroid (11) of said sub-cluster.

4. Volume recognition method according to claim 1, wherein said grouping of points (5) in clusters (6) is carried out according to a method comprising the following steps:
   a) creating a first cluster (6) comprising a first point (5); and
   b) executing the following operations for each other point (5):
      i) finding the cluster (6) whose centroid (7) is closest to said other point in the three-dimensional space; and
      ii) creating an additional cluster (6) comprising said other point if the absolute distance in the three-dimensional space between said other point (5) and said closest cluster centroid (7) is higher than a predetermined threshold $\theta$, and the number of clusters (6) is still under a predetermined maximum q; or
      iii) adding said other point (5) to the cluster (6) whose centroid (7) is closest to said other point (5) if said absolute distance is not higher than the predetermined threshold $\theta$, or the number of clusters (6) has already reached said predetermined maximum q.

5. Volume recognition method according to claim 4, wherein said grouping of points (5) in clusters (6) further comprises the steps of:
   a) determining whether two of said clusters (6) are connected; and
   b) merging connected clusters (6).

6. Volume recognition method according to claim 5, wherein determining whether two of said clusters (6) are connected comprises the steps of:
   a) calculating the standard deviation of the distribution of the projections of the points (5) of each one of said two clusters (6) along an axis (8) linking the centroids (7) of the two clusters (6); and
   b) checking whether the sum of the standard deviations multiplied by a predetermined factor S, for example 2, is higher than the absolute distance between the centroids (7) of the two clusters (6).

7. Volume recognition method according to claim 1, wherein said imaging system (3) comprises a time-of-flight 3D camera, a stereo camera, a plurality of cameras located in different positions in the three-dimensional space, or a LIDAR, sonar or radar system.

8. Volume recognition method according to claim 1, wherein said image data comprise at least depth and zenith and azimuth angles of each point (5), and further comprising a step of transforming depth and zenith and azimuth angles of at least some of these points (5) into three-dimensional Cartesian coordinates.

9. Volume recognition method according to claim 1, wherein said object of interest (1) is at least part of a human body, preferably standing.

10. Volume recognition method according to claim 9, further comprising the step of calculating the approximated centre of mass (17) and main axis (18) of the torso (19) of said body.

11. Volume recognition method according to claim 10, wherein said approximated centre of mass (17) and main axis (18) of the torso (19) are calculated by executing the following steps:
    a) calculating the centroid (7) and main axis (16) of said selected cluster (6);
    b) calculating the distribution curve (20) of the distances of the points (5) of the selected cluster (6) with respect to said main axis (16) of the selected cluster (6);
    c) calculating an inflection point (21) in said distribution curve (20);
    d) selecting the points (5) with distances with respect to said main axis (16) of the selected cluster (6) inferior to D·s, wherein s is the distance of said inflection point (21) to said main axis (16) of the selected cluster (6) and D is a factor of at most 1.25, preferably at most 1; and
    e) calculating said centre of mass (17) and main axis (18) of the torso (19) as the centroid and main axis of the selected points (5).

12. Volume recognition method according to claim 10, wherein signals are transmitted to a data processing system (2) according to the position of the centre of mass (17) of said torso (19) and/or its main axis (18) and/or the orientation of said main axis (18) of said torso (1).

13. Volume recognition method according to claim 10, further comprising the step of measuring the height of the body.

14. Volume recognition method according to claim 13, wherein said height of the body is measured by calculating the heights of the points (5) among those of said selected cluster (6) that are closer than a predetermined distance to the main axis (18) of the torso (19), filtering said heights, preferably by median filtering, and selecting the maximum value of said heights after filtering.

15. Volume recognition method according to claim 14, wherein said measure of the height of the body is only considered as valid if a set of conditions is met, such as said main axis (18) of the torso (19) being substantially vertical.

16. Volume recognition method according to claim 1, wherein the volumes (12) associated with said set of sub-clusters are represented in a virtual environment generated by a data processing system (2).

17. Volume recognition method according to claim 16, wherein there is a collision and/or proximity check between the representation of the volumes (12) of said set of sub-clusters and a set of elements (14) of said virtual environment, so as to interact with said set of elements (14) of the virtual environment.

18. Volume recognition method according to claim 1, wherein a set of links (28) between sub-clusters is established using criteria such as absolute distance between the centroids (11) of the sub-clusters, the presence of points (5) between sub-cluster, etc.

19. Volume recognition method according to claim 18, where a set of extremities (29) of said object of interest (1) is identified according to said links (28).

20. Volume recognition method according to claim 19, wherein at least one of said extremities (29) is labelled according to a predetermined pattern, for example that of a human body.

21. Volume recognition method according to claim 19, wherein signals are transmitted to a data processing system (2) according to an absolute and/or relative position and/or movement of at least one of said extremities (29).

22. Volume recognition system comprising an imaging system (3) for capturing three-dimensional image data representing a plurality of points (5), each point (5) having at least a set of coordinates in a three-dimensional space, and at least some of said points (5) corresponding to an object of interest (1) located in range of said imaging system (3), and a data processing system (2) connected to said imaging system (3) and programmed for carrying out, in cooperation with said imaging system (3), a volume recognition method according to claim 1.

* * * * *